May 22, 1956  H. F. SWENSON ET AL  2,746,730
DISPENSING FREEZER
Filed June 29, 1953  3 Sheets-Sheet 1
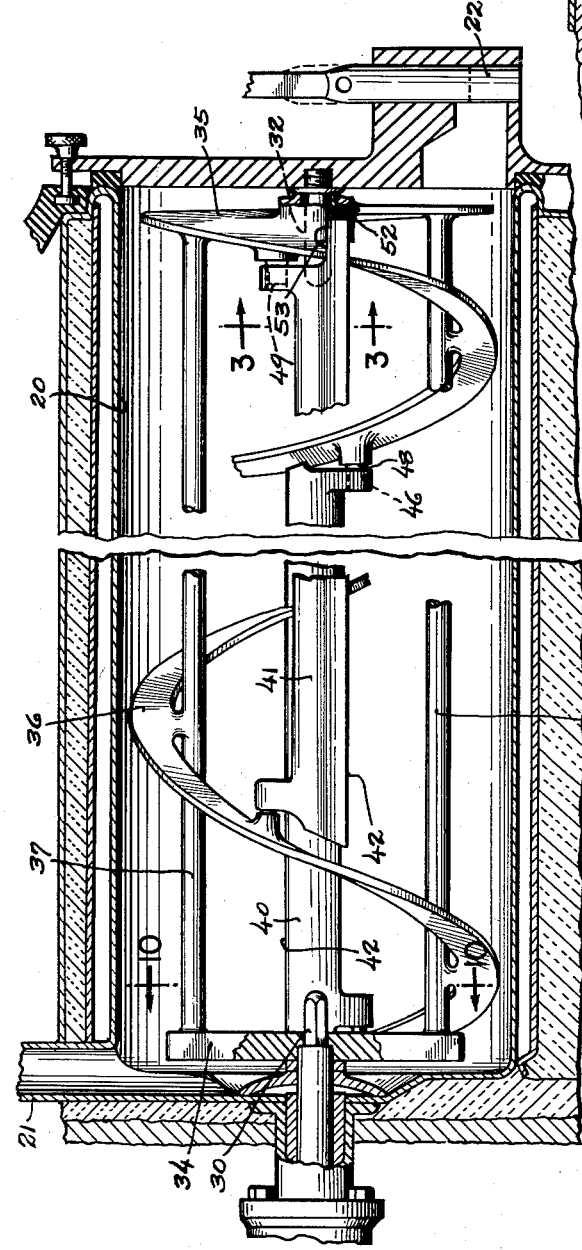
INVENTORS
Harvey F. Swenson
Andre A. Baudat
Herman Ryder May 22, 1956 H. F. SWENSON ET AL 2,746,730
DISPENSING FREEZER
Filed June 29, 1953 3 Sheets-Sheet 2

INVENTORS
Harvey F. Swenson
Andre A. Baudat
Herman Ryder
BY

May 22, 1956  H. F. SWENSON ET AL  2,746,730
DISPENSING FREEZER
Filed June 29, 1953  3 Sheets-Sheet 3

INVENTORS.
Harvey F. Swenson
Andre A. Baudat
Herman Ryder
BY Barnes & Seed
attys.

United States Patent Office 2,746,730
Patented May 22, 1956

2,746,730

DISPENSING FREEZER

Harvey F. Swenson, Andre A. Baudat, and Herman Ryder, Seattle, Wash., assignors to Sweden Freezer Manufacturing Company, Seattle, Wash., a corporation of Washington Application June 29, 1953, Serial No. 364,824

15 Claims. (Cl. 259—9)

This invention relates to dispensing freezers, and namely freezers customarily found in soda fountains and other establishments and used to freeze and dispense ice cream, ice custards and other applicable frozen products. The freezer is of that nature providing a freezing cylinder with means for introducing thereto charges of the mix which is to be frozen, presenting a valved outlet at one end through which the frozen product is dispensed, and having a dasher mounted within the cylinder. The present invention is concerned with perfecting the dasher so that, while continuing to perform the functions usual to a dasher, and namely whipping air into freshly introduced mix, scraping the product from the freezing wall of the cylinder as it freezes thereon, and also pushing the frozen product toward the discharge end, the dasher additionally accomplishes a "zoning" action holding such of the contents of the cylinder as are ready for serving separate from the fresh mix which, for purposes of overrun, requires that a certain amount of air be whipped into the same as it is being frozen. When this fresh mix is permitted to channel itself through the frozen product this dispensed servings lack uniformity and preclude an operator from obtaining a product with the degree of stiffness which most of the purchasing public desire.

With the above-stated and other more particular objects and advantages in view and which will appear and be understood in the course of the following description and claims, the invention consists in the novel construction and in the adaptation and combination of parts hereinafter described and claimed.

In the accompanying drawings:

Figure 1 is a fragmentary view partly in elevation and partly in longitudinal vertical section illustrating a dispensing freezer embodying teachings of the present invention.

Fig. 2 is a fragmentary longitudinal vertical sectional view drawn to a scale larger than that of Fig. 1 and illustrating a dispensing freezer embodying the teachings of the present invention but modified somewhat from the freezer of Fig. 1.

Fig. 3 is a fragmentary transverse vertical sectional view drawn to an enlarged scale on line 3—3 of Fig. 1.

Figure 4:
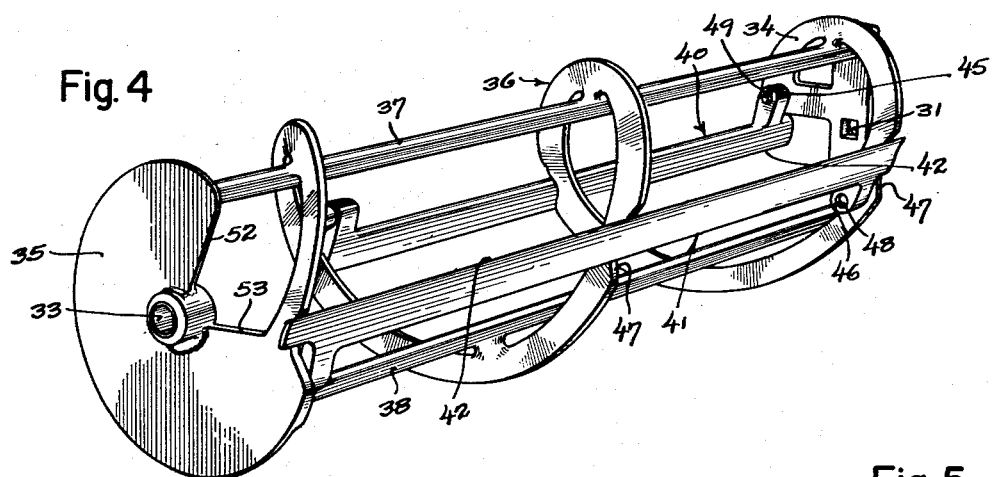
Fig. 4 is a perspective view showing the dasher of Fig. 1 removed from the freezing cylinder.
Figure 5:
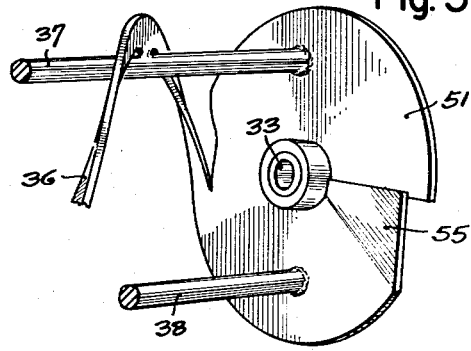
Fig. 5 is a fragmentary perspective view showing the front end of the modified dasher portrayed in Fig. 2.
Figure 6:
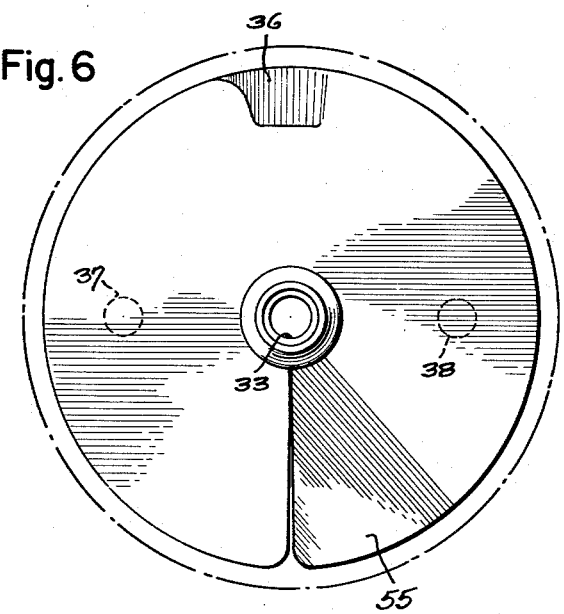
Figs. 6 and 7 are enlarged-scale front elevational and fragmentary side elevational views, respectively, of said modified dasher shown in Figs. 2 and 5.
Figure 7:
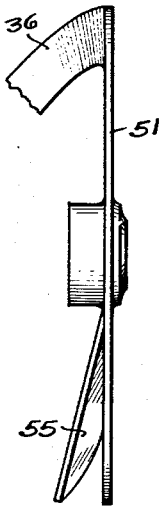
Figure 8:
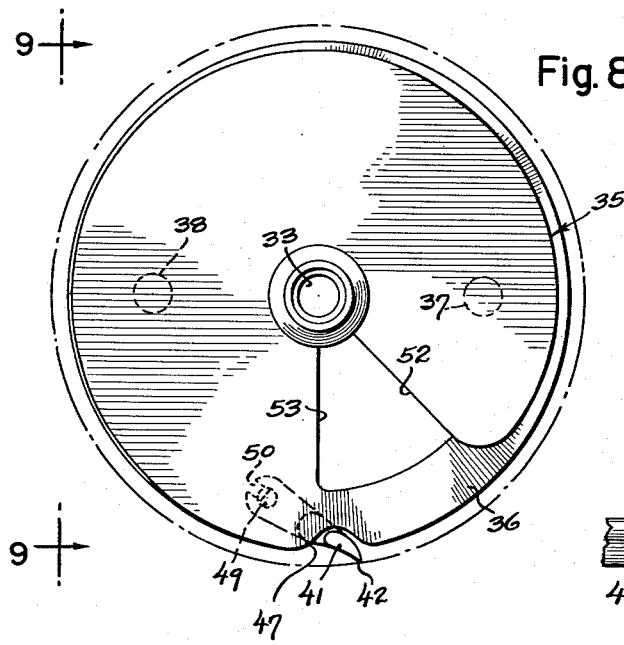
Figs. 8 and 9 are enlarged-scale front elevational and fragmentary side elevational views, respectively, of the dasher shown in Figs. 1 and 4.
Figure 9:
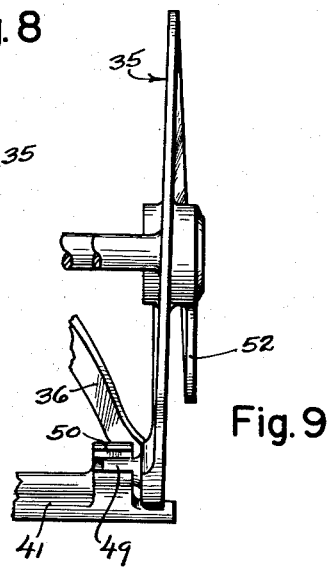

Generally considered, dispensing freezers as they are presently known can be said to fall in one of two categories, (1) the continuous-operation freezer in which replenishing fresh mix is fed in small charges to the freezing cylinder automatically in response to each act of dispensing a serving therefrom, and (2) the intermittent operation freezer in which no fresh mix is introduced to the cylinder until the frozen contents have been completely dispensed whereupon a full replenishing batch is charged by hand into the cylinder and the machine is then taken out of service during the time necessary to freeze-condition this fresh batch. Shown in Fig. 1 and denoted by the numeral 20 is a freezing cylinder suitable for use in a machine of the continuous-operation type, with a stand pipe 21 for the replenishing of fresh mix being provided at the rear end and having at the front end a plunger-type valve 22 movable from a normal closed lower position into a raised open position. In Fig. 2 we have illustrated the front end of a typical machine designed for intermittent operation, it being here customary to feed the fresh mix into the front end of the machine through a feed throat provided in a freezer-front 23. The feed throat is designated by 24 and a gate-type valve for dispensing the frozen product is designated by 25.

Proceeding now to describe the dasher of the present invention, the same is journaled within the cylinder for rotation about the center of the latter as an axis. The manner of mounting and the means of driving are unimportant but for purposes of illustration we have shown a dasher mounted and driven in much the same manner as the dasher illustrated and described in U. S. Patent No. 2,604,307, issued July 22, 1952, and this is to say that a sectionally square driving jack-shaft 30 projecting into the rear end of the freezing cylinder fits into a mating socket 31 provided at the rear end of the dasher, and a journal pin 32 carried by the freezer-front fits into a bushed socket 33 provided at the front end of the dasher. The sockets are each formed in a respective dasher head, as 34 and 35, and connecting these heads is a helically developed dasher blade 36 and a pair of reinforcing stay rods 37 and 38, the stay rods running parallel to the rotary axis of the dasher and lying equidistantly therefrom at diametrically opposite sides of said axis. The developed helix of the dasher blade is such that the pitch of the convolutions is rather steep so as, on rotation, to exert a fairly heavy end thrust upon milk or cream products stiffened by freezing. The dasher blade is sectionally rectangular and positioned so that the major axis of the section constantly occupies a radius of the center about which the helix is developed. The O. D. of the blade is somewhat less than the inside diameter of the freezing cylinder and such outside diameter is constant throughout the length of the helix. The dasher also presents a pair of scraper blades 40 and 41 disposed diametrically opposite one another at points removed 90° or thereabouts from the stay rods. These blades have a lanceolate shape when viewed in transverse vertical section, and this is to say that they have a fairly broad body giving weight to the blade and taper to a rather sharp edge 42. Each blade preferably has each a length as will extend from one end limit of the dasher to a point on the helix removed 180° from the other end. Arms 43 and 44 project inwardly along the approximate major axis of each of said lanceolate-shaped scraper blades beyond the broadened butts thereof, and provided in these arms are bearing sockets, as 45 and 46, placed coaxial to one another and parallel with the taper edge 42. Reentrant openings 47 are cut in the helical dasher blade and also in the headers to accommodate pivotal movement of the scraper blades, and fitting in the sockets to establish a pivotal mounting for the scraper blades are pins 48 and 49, the two pins 48, one for each scraper blade, being carried by the dasher blade, and the two pins 49 being carried one by the header 34 and the other by the header 35. In order that the scraper blades may be disconnected from the dasher, and as can be best seen from an inspection of Fig. 3, the bearing sockets 45 are formed much in the manner of a key-hole slot with an exposed narrow throat 50 leading to the socket proper. Each of the two header-carried pins 49 are flattened upon one side to present a diameter reduced sufficiently from the normal round of the pin to pass through this narrow throat, with such flat of the pin lying more or less at right angles to the median line of the throat when the scraper blade occupies the normal operating position in which it is shown in Fig. 3. The wall of the freezing cylinder, on the one hand, and the back wall of the re-entrant openings 47, on the other hand, so limit the permitted swivel movement of the scraper blades as to preclude the scraper blades from becoming dislodged from their mounting pins while the dasher occupies its operating position within the cylinder.

Considerable significance, in the present dasher, attaches to the configuration of the header lying at the discharge end of the freezing cylinder. As hereinbefore pointed out in course of describing the several views of the drawings there are two illustrated embodiments of such discharge header, the one being portrayed in Figs. 1, 4, 8 and 9, and the other being shown in Figs. 2, 5, 6 and 7. The numeral 35 will apply to the former embodiment, and the latter embodiment will be designated by 51. First describing the head 35, the same is in the nature of an auger plate suggesting a single convolution of a conveyor screw, being developed spirally on a very steep pitch through somewhat short of a complete revolution so that there is provided a leading edge 52 moderately advanced beyond a trailing edge 53. The tail end of the spiral dasher blade merges with such trailing edge adjacent the perimeter of the auger plate. Said perimeter is made eccentric to the axis of the dasher, having the greater radius, as between leading and trailing edges, in the trailing edge. There is thus provided, between the rim of the auger and the interior wall of the freezing cylinder, a clearance which progressively increases with the approach toward the leading edge. This space between auger and freezing wall permits the frozen product pushed by the spiral blade into the head end of the freezing cylinder to return to the back face of the auger when the discharge opening is closed.

The significance of the modified head 51 is that the same substantially eliminates any auger action, insofar as its own functioning is concerned, the dasher obtaining forward motion of the frozen contents of the freezing cylinder only by the thrust action of the fairly steeply pitched spiral blade 36. We have found it necessary to eliminate undue head thrust in intermittent operation machines where there is an admission throat at the front of the machine for introducing the fresh mix. During intervals when the dasher is operating and the discharge valve is closed, there is likelihood of the freeze-conditioned product being pushed upwardly through the admission throat if the head exerts an auger action upon such product.

Figure 11:
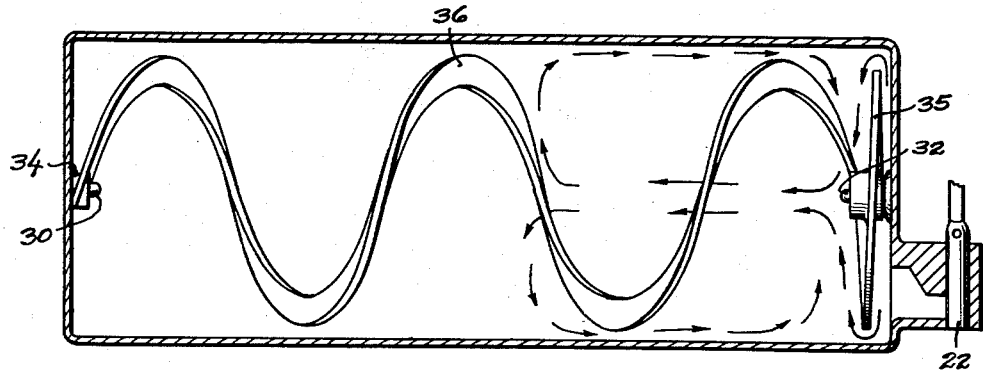
Fig. 11 is a schematic view picturing the zoning action of the present freezer.
Figure 10:
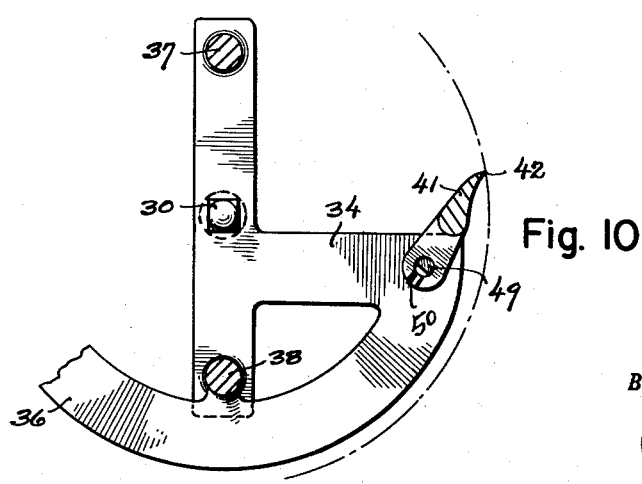
Fig. 10 is a fragmentary transverse vertical section drawn to an enlarged scale on line 10—10 of Fig. 1.

The general circulation pattern of the product can be seen from an inspection of Fig. 11 and is as follows:

When the product is being processed within the freezing cylinder and with the discharge valve closed, there are two major directions of flow of the product:

(1) A forward flow along the outer periphery of the front section of the dasher's spiral blade up to the auger plate. Only a minor part of this flow reaches the front face of the auger plate due to the necesisty for such entering product to displace a like volume of product from the front side of the auger plate, the displaced product being returned to the back side of the auger plate through the small relief space surrounding the plate.

(2) An inward travel of the major part of this forwardly flowing product, together with the amount of product displaced through the relief space, the two bodies joining and working along the back face of the plate to the center of the dasher, whereupon the product moves rearwardly until, through centrifugal force, it is free to again reach the outer periphery of the cylinder to be caught up by the forward thrust of the spiral blade. It will be apparent, regardless of the amount of product ready for serving, that the described circulation will occur and constantly maintain a zone of stiffened product at the front of the dasher. Where unfrozen fresh mix is fed at intervals into the cylinder to replace dispensed servings this added mix enters a zone at the back of the cylinder and stays in this zone until it has become properly whipped and obtains sufficient texture or consistency so that the action of the spiral blade will take effect and gradually bring such fresh product into the "ready-to-serve" forward zone. Whenever the discharge valve is opened to dispense a serving the auger forces the product through the discharge opening. It should be stressed that the dasher serves at all times to produce the main current of circulation so as to maintain an evenness of temperature, texture, flavor, etc. of the product.

What we claim, is:

1. A rotary dasher for use in the freezing cylinder of a dispensing ice cream freezer and comprised of headers occupying positions one at the front end and the other at the rear end of the dasher and reinforced by stay rods made integral with the headers and located parallel to the rotary axis at diametrically opposite sides thereof, said front header consisting of a disc-like member generally circular in shape with an access opening allowing the product processed in the freezing cylinder to pass from the back to the front side thereof, said access opening comprising only a minor part of the header's areal compass, a dasher blade extending between and integrated by its ends with the headers and tracing the locus of a spiral developed about the rotary axis of the dasher, and a scraper blade detachably associated with the headers and receiving a journal mounting therefrom supporting the scraper blade for wrist movement about an axis paralleling said rotary axis of the dasher, said developed spiral of the dasher blade having a comparatively steep pitch.

2. A rotary dasher for use in the freezing cylinder of a dispensing ice cream freezer and comprised of headers occupying positions one at the front end and the other at the rear end of the dasher and reinforced by stay rods made integral with the headers and located parallel to the rotary axis at diametrically opposite sides thereof, said front header consisting of a disc-like member generally circular in shape with an access opening allowing the product processed in the freezing cylinder to pass from the back to the front side thereof, said access opening comprising only a minor part of the header's areal compass, a dasher blade extending between and integrated by its ends with the headers and tracing the locus of a spiral developed about the rotary axis of the dasher, and a scraper blade detachably associated with the headers and receiving a journal mounting therefrom supporting the scraper blade for wrist movement about an axis paralleling said rotary axis of the dasher, the distance between the extreme ends of the dasher blade along the traced locus of the spiral being at least twice the axial length of the dasher.

3. A rotary dasher for use in the freezing cylinder of a dispensing ice cream freezer and comprised of headers occupying positions one at the front end and the other at the rear end of the dasher, said front header consisting of a disc-like member generally circular in shape with an access opening allowing the product processed in the freezing cylinder to pass from the back to the front side thereof, said access opening comprising only a minor part of the header's areal compass, a dasher blade extending between and integrated by its ends with the headers and tracing the locus of a spiral developed about the rotary axis of the dasher, and a scraper blade detachably associated with the headers and receiving a journal mounting therefrom supporting the scraper blade for wrist movement about an axis paralleling said rotary axis of the dasher, said developed spiral of the dasher blade having a comparatively steep pitch.

4. A rotary dasher for use in the freezing cylinder of a dispensing ice cream freezer and comprised of a dasher blade tracing the locus of a spiral developed about the rotary axis of the dasher, and a steeply pitched auger-plate serving as a front end header for the dasher blade and having said blade merging therewith at the outer limit of the auger-plate's trailing edge.

5. The rotary dasher of claim 4 in which the perimeter of the auger-plate is eccentric to the rotary axis of the dasher with the greatest diameter of said auger-plate being at the trailing edge.

6. A rotary dasher for use in the freezing cylinder of a dispensing ice cream freezer and comprised of a dasher blade tracing the locus of a spiral developed about the rotary axis of the dasher, and a circular plate serving as a front-end header for the dasher, said plate having a diameter moderately less than the diameter of the cylinder in which the dasher is to be used and providing an opening through which the product processed in the cylinder is fed by force of the dasher blade's thrust to the front side of the plate, said opening comprising only a minor part of the header's areal compass.

7. A rotary dasher for use in the freezing cylinder of a dispensing ice cream freezer and comprised of a dasher blade tracing the locus of a steeply pitched spiral developed about the rotary axis of the dasher, and a circular plate serving as a front-end header for the dasher and formed to provide an opening through which the product processed in the cylinder is fed by force of the dasher blade's thrust to the front side of the plate, said opening comprising only a minor part of the header's areal compass, said header plate also providing a relief opening through which the processed product is returned from the front to the back side of the plate when the product is not being dispensed from the cylinder.

8. The rotary dasher of claim 7 having a scraper blade journal-mounted from the dasher for wrist movement about an axis paralleling the rotary axis of the dasher, and wherein the front end of said scraper blade projects forwardly beyond the front face of said front-end header plate.

9. A rotary dasher according to claim 8 in which the outer edge of the dasher blade and the perimeter of the front-end header plate present re-entrant openings accommodating the swivel movement of the scraper blade.

10. In a dispensing ice cream freezer, an open-front freezing cylinder having a centrally placed opening in the rear wall, a freezer-front arranged to be clamped tightly over said open front, said freezer-front presenting a valved discharge opening and also providing a thrust and journal bearing exposed to the inner side of the freezer-front and so positioned as to lie co-axial to the cylinder when the freezer-front is applied to the cylinder, a dasher received in the cylinder with its front end journaled on the bearing pin and having its rear end sustained by a drive shaft placed co-axial to the bearing pin and projecting through said rear-wall opening of the cylinder, said dasher having a dasher blade tracing the locus of a spiral developed about the rotary axis of the dasher and also having a steeply pitched auger-plate serving as a front-end header for the dasher and disposed in closely spaced proximity to the freezer-front, the front end of said dasher blade merging with the trailing edge of said auger-plate at the outer limit of the latter, and said auger-plate being smaller in diameter than the diameter of the cylinder so that a relief space is provided about the entire circumference of the auger-plate.

11. A rotary dasher for use in the freezing cylinder of a dispensing ice cream freezer and comprised of a dasher blade tracing the locus of a steeply pitched spiral developed about the rotary axis of the dasher, and a steeply pitched auger-plate serving as a front end header for the dasher blade and having said blade merging therewith at the outer limit of the auger-plate's trailing edge.

12. A rotary dasher for use in the freezing cylinder of a dispensing ice cream freezer and comprised of a dasher blade tracing the locus of a steeply pitched spiral developed about the rotary axis of the dasher, and a circular plate serving as a front-end header for the dasher and formed to provide an opening the areal extent of which is quite minor by comparison with the areal compass of the plate and through which the product processed in the cylinder is fed by force of the dasher blade's thrust to the front side of the plate, said header plate being so formed as to permit the processed product to return from the front to the back side of the plate when the product is not being dispensed from the cylinder.

13. A rotary dasher for use in the freezing cylinder of a dispensing ice cream freezer and comprised of a dasher blade tracing the locus of a spiral developed about the rotary axis of the dasher, a generally circular plate serving as a front end header for the blade, and a scraper blade carried by the dasher with its front end projecting forwardly beyond the front face of said plate.

14. In combination with the freezing cylinder of a dispensing ice cream freezer, a rotary dasher comprised of a dasher blade tracing the locus of a steeply pitched spiral developed about the rotary axis of the dasher with the outside diameter somewhat less than the diameter of the cylinder, a generally circular plate serving as a front end header for the blade and having a diameter approximating that of the dasher blade, and a journal mounting for said dasher supporting the latter for rotation within the cylinder about the center of the latter as an axis and in such a position as leaves a substantial space to the front of the plate, said plate providing an opening the areal extent of which is quite minor by comparison with the areal compass of the plate and through which the product processed in the cylinder is fed to said front space by force of the dasher blade's thrust.

15. Structure according to claim 14 having a scraper blade carried by the dasher with its front end projecting forwardly beyond the front face of the plate to approximately the front-end limit of the cylinder.

References Cited in the file of this patent

UNITED STATES PATENTS

| 2,289,613 | Weinrich | July 14, 1942 |
| 2,382,605 | Carter | Aug. 14, 1945 |
| 2,506,101 | Oltz | May 2, 1950 |
| 2,535,462 | Stoelting et al. | Dec. 26, 1950 |
| 2,587,127 | Erickson et al. | Feb. 26, 1952 |
| 2,591,601 | Peters et al. | Apr. 1, 1952 |
| 2,604,307 | Swenson | July 22, 1952 |